United States Patent
Walker

[19]

[11] Patent Number: 6,092,325
[45] Date of Patent: Jul. 25, 2000

[54] FISHING JUG

[76] Inventor: Jeffery T. Walker, 206 Bateman Ave., Franklin, Tenn. 37067

[21] Appl. No.: 08/997,829

[22] Filed: Dec. 24, 1997

[51] Int. Cl.⁷ .................................................. A01K 91/00
[52] U.S. Cl. ......................... 43/43.11; 215/211; 215/228
[58] Field of Search .................... 43/4, 4.5, 15, 43.1, 43/43.11, 43.15; 215/211, 227, 228

[56] References Cited

U.S. PATENT DOCUMENTS

| D. 291,905 | 9/1987 | Brachear | D22/146 |
| 4,607,449 | 8/1986 | Brachear | 43/43.11 |
| 4,672,769 | 6/1987 | Thompson | 43/43.11 |
| 4,856,219 | 8/1989 | Severence et al. | 43/17.5 |
| 4,858,369 | 8/1989 | Collins | 43/43.1 |
| 5,033,225 | 7/1991 | Waldroop et al. | 43/43.11 |
| 5,048,219 | 9/1991 | Georgescu | 43/4 |
| 5,207,013 | 5/1993 | Bartok et al. | 43/4 |
| 5,265,369 | 11/1993 | Botkins | 43/43.11 |

FOREIGN PATENT DOCUMENTS

| 98811 | 10/1961 | Norway . |
| 116735 | 5/1969 | Norway . |

*Primary Examiner*—Jack W. Lavinder
*Attorney, Agent, or Firm*—Richard C. Litman

[57] ABSTRACT

A fishing jug including an elongated container with a larger, closed end and a smaller, open end. The closed end of the container includes an integrally formed U-shaped handle to facilitate retrieval of the fishing jug when fishing is completed. The open end of the container is threaded. The fishing jug also includes a reversible, double-ended lid which is matingly threaded in each end, and thus is removably attached to the open end of the container; the lid prevents water from entering the container when the fishing jug is in use. The reversible lid includes a central portion having two sides with a fishing loop connected to each side. The container also includes a recessed portion to accommodate application of a label to identify the fisherman using the fishing jug.

11 Claims, 3 Drawing Sheets

FISHING JUG

BACKGROUND OF THE INVENTION

1. Field of the Invention

The present invention relates to baited hook and line fishing, and more particularly concerns a fishing technique known as jug fishing.

2. Description of the Related Art

A common fishing technique known for years is jug fishing. Jug fishing typically involves tying a line with a baited hook onto the handle of an empty plastic jug of the kind used for packaging milk, laundry bleach, and other common commodities of commerce. A fishermen sets the jug and line adrift in bodies of water such as farm ponds, coves, creeks, lakes, etc. Rapid bobbing or running of the jug indicates that a fish is hooked. The fisherman rows or motors his boat to the jug, retrieves the fish, rebaits the hook, and returns the jug to the water.

Many states allow up to fifty jugs per license holder. Handling such a large number of jugs in a boat requires great care to avoid tangling of the lines, both when launching them, and when retrieving them after fishing is concluded. It is both time consuming and inefficient to bait individual hooks as the jugs are placed in the water, while simultaneously handling the oars and occasionally separating tangled lines. Therefore, there is a need for an improved jug configuration to enhance the efficiency of jug fishing.

The related art is represented by the following patents of interest.

U.S. Design Pat. No. 291,905, issued on Sep. 15, 1987 to Howard Brachear, and U.S. Pat. No. 4,607,449, issued on Aug. 26, 1986 to Howard Brachear, both show a fishing jug comprising a container with two end walls and a handle with a removable seal plug. Neither one of Brachear '905 and Brachear '449 suggest a fishing jug according to the claimed invention.

U.S. Pat. No. 4,672,769, issued on Jun. 16, 1987 to Fayette Thompson, describes a fishing float comprising a buoyant member and a pulley mounted to the buoyant member. A guide means is mounted to the buoyant member for guiding a fishing line onto and off the pulley. Thompson does not suggest a fishing jug according to the claimed invention.

U.S. Pat. No. 4,856,219, issued on Aug. 15, 1989 to Marcus W. Severance et al., describes a fishing float comprising a pair of oppositely disposed buoyant members each having a first end removably connected by a locking stem. Severance et al. do not suggest a fishing jug according to the claimed invention.

U.S. Pat. No. 4,858,369, issued on Aug. 22, 1989 to Bark Collins, describes a fishing float comprising a spherical body having a line engaging downward projection extending from one point on the exterior of the body and a combination handle and line wrapping extension extending from the spherical body diametrically opposite from the downward projection. Collins does not suggest a fishing jug according to the claimed invention.

U.S. Pat. No. 5,265,369, issued on Nov. 30, 1993 to L. T. Botkins, describes a jug fishing device comprising a container with a closure lid portion having a spool portion to accommodate a length of spirally wound fishing line forwardly emergent from the closure lid portion and a circular flange penetrated by the line forwardly emergent from the closure lid portion. Botkins does not suggest a fishing jug according to the claimed invention.

Norway Patent Number 98,811, published on Oct. 23, 1961, shows a fishing float comprising a buoyant container having a closure with means to secure a fishing line. Norway '811 does not suggest a fishing jug according to the claimed invention.

Norway Patent Number 116,735, published on May 12, 1969, shows a fishing float comprising a buoyant longitudinal container including means for connecting a fishing line to two opposed ends of the container. Norway '735 does not suggest a fishing jug according to the claimed invention.

None of the above inventions and patents, taken either singularly or in combination, is seen to describe the instant invention as claimed.

SUMMARY OF THE INVENTION

The present invention is a fishing jug comprising an elongated container made of buoyant material, such as plastic. The elongated container is preferably circular in cross-section with a larger end and a smaller end, and preferably a volume of thirty-two ounces or greater. The container includes a recessed portion to accommodate application of a label to identify the fisherman using the fishing jug. The container is filled with air and has a closed end (larger diameter end) and an open end (smaller diameter end). The closed end of the container includes an integrally molded, U-shaped handle extending externally from the closed end to facilitate retrieval of the fishing jug when fishing is completed. The open end of the container includes external integrally molded threaded members. A reversible lid is removably attached to the open end to prevent water from entering the container when the fishing jug is in use. The reversible lid includes a central portion having two sides with a fishing loop connected to each side. Internally molded threaded members configured to cooperate with the externally integrally molded threaded members on the open end of the container extend from either side the central portion of the reversible lid.

The reversible lid enables the fishing jug to be employed in a fishing position or a storage position. In the fishing position the reversible lid is rotated to place the loop with a fishing line connected thereto to extend externally from the fishing jug, and then the reversible lid is secured to the open end of the container. In the storage position the reversible lid is rotated to place the loop with a fishing line connected thereto to extend internally into the container, and then the reversible lid is secured to the open end of the container. This enables the fishing jugs to be piled randomly in a boat without the lines or hooks snagging one another.

Accordingly, it is a principal object of the invention to provide a fishing jug including a container having a closed large end with a U-shaped handle integrally molded extending externally from the closed end, an open small end including external, integrally molded threaded members, and a reversible lid removably attached to the small end.

It is another object of the invention to provide a fishing jug with a container and a removable reversible lid including a central portion having two sides with a fishing loop connected to each side, and internally molded threaded members extending from either side the central portion of the reversible lid.

It is an object of the invention to provide improved elements and arrangements thereof in a fishing jug for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
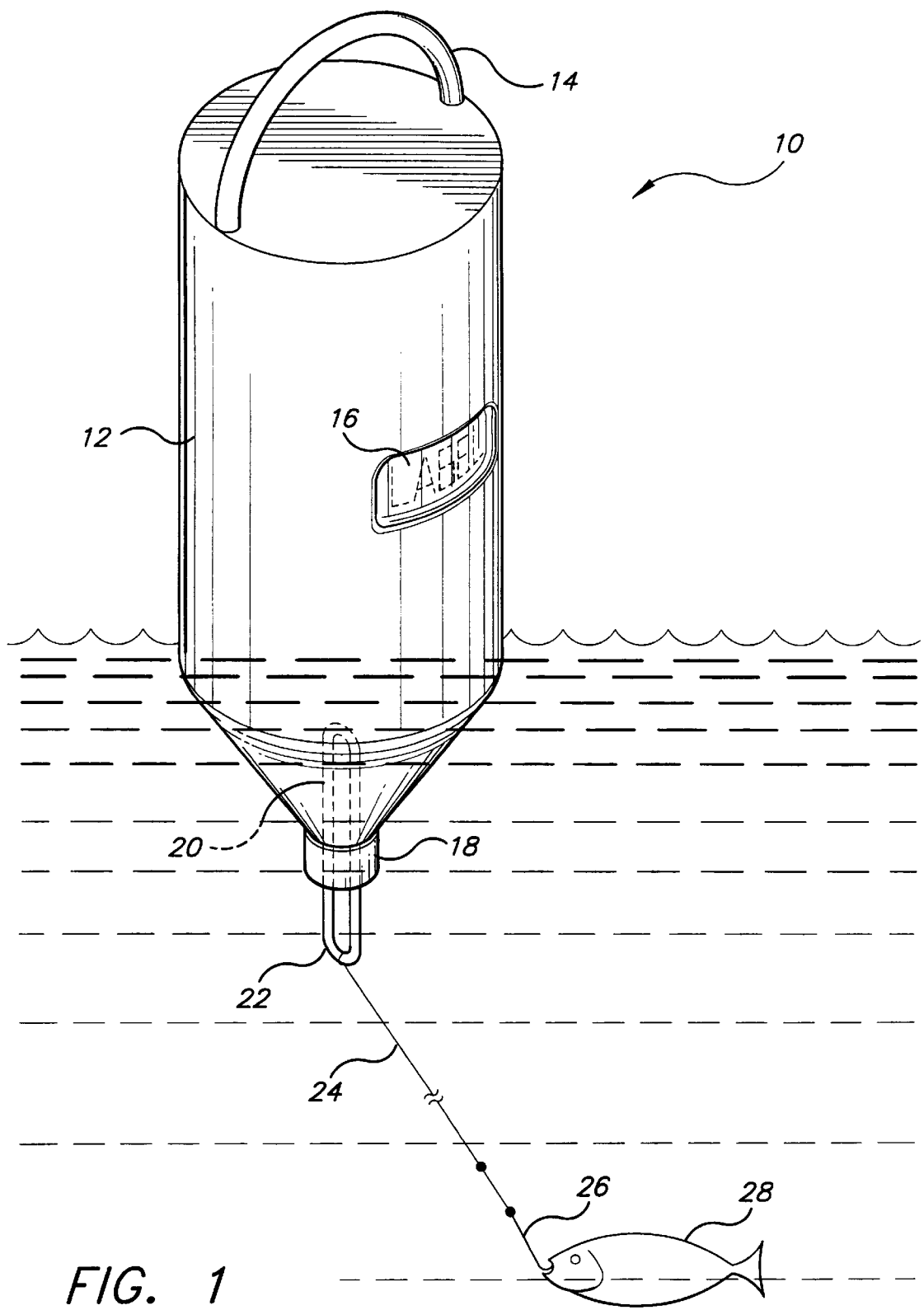
FIG. 1 is an environmental, perspective view of a fishing jug according to the present invention shown in a fishing position.

Referring now to the specific embodiment of the invention in the drawings, a fishing jug generally designated 10 comprises an elongated container 12 made of buoyant material, such as plastic material. The buoyant material is preferably externally colored with a bright color to enable fisherman to see the fishing jugs, such as white, fluorescent orange, fluorescent green, etc. The elongated container 12 is preferably circular in cross-section with a larger end and a smaller end and preferably a volume of thirtytwo ounces or greater. The container 12 includes a recessed portion 16 to accommodate application of a label to identify the fisherman using the fishing jug 10. The container 12 is filled with air and has a closed end (larger diameter end) and an open end (smaller diameter end).

Figure 2A:
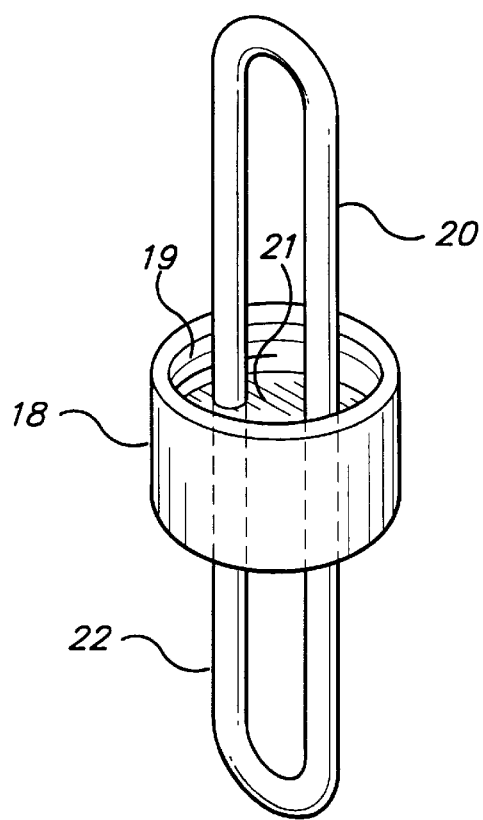
FIG. 2A is an enlarged scale, perspective view of a reversible fishing jug cap according to the invention.
Figure 2B:
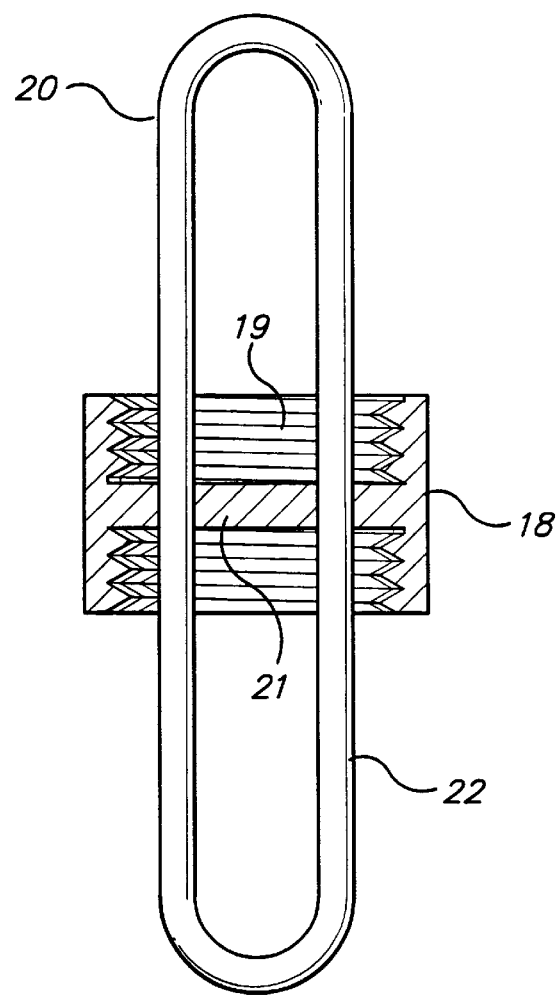
FIG. 2B is an enlarged scale, cross-sectional view of the reversible fishing jug cap shown in FIG. 2A.

The closed end of the container 12 includes an integrally formed U-shaped handle 14 extending externally from the closed end to facilitate retrieval of the fishing jug when fishing is completed. The open end of the container includes an external integrally molded threaded member (not shown). A reversible lid 18 is removably attached to the open end to prevent water from entering the container 12 when the fishing jug 10 is in use. As shown in FIGS. 2A and 2B, the reversible lid 18 includes a central portion 21 having two sides with a fishing loop 20,22 connected to each side. Internally molded threaded members 19 configured to cooperate with the externally integrally molded threaded members on the open end of the container 12 extend from either side the central portion 21 of the reversible lid 18.

Referring now to FIG. 1, a fisherman in a boat configures the fishing jug 10 in a fishing position by rotating the reversible lid 18 to place the loop 22 with a fishing line connected thereto to extend externally from the fishing jug 10, and then the reversible lid 18 is secured to the open end of the container 12. The fisherman then tosses out the fishing jug 10 into a body of water, such as a lake, with some bait, such as a worm, attached to the hook 26 at the beginning of the time that the fisherman desires for the fishing jug 10 to be in use to catch a fish 28. Then, the fisherman moves the boat away from the area so that there is no disturbance near the fishing jug 10.

After a while a fish 28 sees the bait and makes a move to try to eat the bait, at which time, the fish 28 bites the bait and the hook 26, causing the fishing jug 10 to be drawn below the surface of the water. Since the container 12 is buoyant, it provides resistance against the pull that the fish exerts in pulling the fishing jug 10 below the surface by tending to bob towards and above the surface, thereby setting the hook 26 in the mouth of the fish 28. The fish 28 then runs with the fishing jug 10, which exerts drag on the fishing line 24 thereby tiring the fish 28 until the fish 28 rests in the same spot out of exhaustion.

The fisherman comes back to the area after a certain amount of time and locates fishing jugs 10 that were earlier tossed into the body of water by looking for containers 12 sitting partially on the surface. The fisherman then moves his or her boat in the vicinity of each fishing jug 10 to pick up the fishing jug 10 and any fish 28 attached and uses a net to facilitate in the capture of the fish 28.

Figure 3:
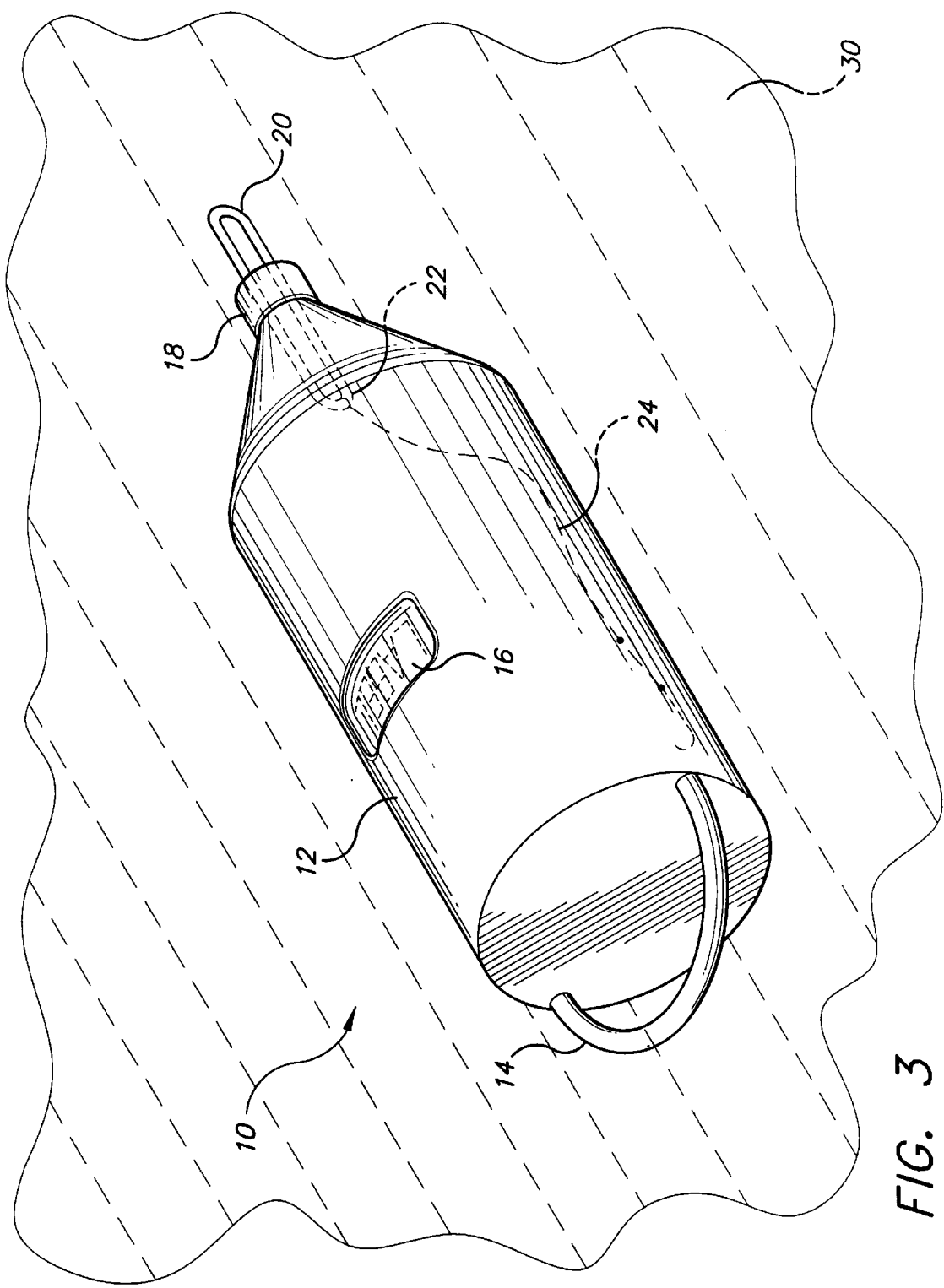
FIG. 3 is a perspective view of a fishing jug according to the present invention shown in a storage position.

FIG. 3 illustrates the fishing jug 10 in a storage position. The reversible lid 18 is rotated from the fishing position and the fishing line 24 is inserted into the container 12. This is an important feature of the present invention because all of the fishing jugs used by a fisherman may have fishing lines connected to one loop of a reversible lid and the fishing lines may each be inserted into a fishing jug 10. Once the line is fully inserted into the fishing jug the reversible cap is secured to the open end of the container 12. This enables the fishing jugs to be piled randomly in a boat without the lines or hooks snagging one another.

It is to be understood that the present invention is not limited to the sole embodiment described above, but encompasses any and all embodiments within the scope of the following claims.

I claim:

1. A fishing jug comprising:

an elongated hollow cylindrical container of buoyant material with a closed end and an open end having an external integrally molded threaded member opposite the closed end, said closed end having a larger diameter than said open end;

a reversible lid for closing said open end, and having a central portion with two sides;

a U-shaped fishing loop attached to each side of said reversible lid;

a fishing line attached to one fishing loop of said reversible lid; and a hook attached to said fishing line at an end of said fishing line opposite said reversible lid;

wherein said elongated hollow cylindrical body of buoyant material is filled with a sufficient volume of air to continue floating after a fish has been hooked.

2. The fishing jug according to claim 1, wherein said closed end of said container includes an integrally molded, U-shaped handle extending externally from said closed end to facilitate retrieval of said fishing jug when fishing is completed.

3. The fishing jug according to claim 1, wherein said reversible lid includes internally molded, threaded members extending from either side of said central portion of said reversible lid, and configured to cooperate with said external integrally molded threaded member on said open end of said container.

4. The fishing jug according to claim 1, wherein said container includes a recessed portion to accommodate application of a label to identify fishermen using said fishing jug.

5. The fishing jug according to claim 1, wherein said container is externally colored white.

6. The fishing jug according to claim 1, wherein said container is externally colored fluorescent orange.

7. The fishing jug according to claim 1, wherein said container is externally colored fluorescent green.

8. A fishing jug comprising:

an elongated hollow cylindrical container of buoyant material with a closed end having an integrally molded U-shaped handle extending externally from said closed end to facilitate retrieval of said fishing jug when fishing is completed, and an open end having an external integrally molded threaded member opposite the closed end, said closed end having a larger diameter than said open end, wherein said container includes a recessed portion to accommodate application of a label to identify fishermen using said fishing jug;

a reversible lid for closing said open end having a central portion with two sides each including internally molded threaded members extending from either side said central portion of said reversible lid configured to cooperate with said external integrally molded threaded member on said open end of said container;

a U-shaped fishing loop attached to each side of said central portion of said reversible lid;

a fishing line attached to one fishing loop of said reversible lid; and a hook attached to said fishing line at an end of said fishing line opposite said reversible lid;

wherein said elongated hollow cylindrical body of buoyant material is filled with a sufficient volume of air to continue floating after a fish has been hooked.

9. The fishing jug according to claim 8, wherein said container is externally colored white.

10. The fishing jug according to claim 8, wherein said container is externally colored fluorescent orange.

11. The fishing jug according to claim 8, wherein said container is externally colored fluorescent green.

* * * * *